(12) United States Patent
Cho

(10) Patent No.: US 11,511,672 B2
(45) Date of Patent: Nov. 29, 2022

(54) LUGGAGE BOARD DEVICE FOR VEHICLE

(71) Applicants: HYUNDAI MOTOR COMPANY, Seoul (KR); KIA CORPORATION, Seoul (KR)

(72) Inventor: Jang Hyun Cho, Seongnam-si (KR)

(73) Assignees: HYUNDAI MOTOR COMPANY, Seoul (KR); KIA CORPORATION, Seoul (KR)

( * ) Notice: Subject to any disclaimer, the term of this patent is extended or adjusted under 35 U.S.C. 154(b) by 1 day.

(21) Appl. No.: 17/339,119

(22) Filed: Jun. 4, 2021

(65) Prior Publication Data
US 2022/0185191 A1   Jun. 16, 2022

(30) Foreign Application Priority Data
Dec. 10, 2020   (KR) .................. 10-2020-0172632

(51) Int. Cl.
*B60R 5/04*   (2006.01)
*B60R 5/00*   (2006.01)

(52) U.S. Cl.
CPC ............. *B60R 5/003* (2013.01); *B60R 5/04* (2013.01)

(58) Field of Classification Search
CPC .......... B60R 5/003; B60R 5/04; B60R 5/044; B60R 5/045; B60R 5/048
USPC ...................................... 296/24.4
See application file for complete search history.

(56) References Cited

U.S. PATENT DOCUMENTS 4,941,797 A * 7/1990 Smillie, III ............... B66F 3/12
                                                        187/269
5,836,636 A * 11/1998 Adams ............... B65D 90/0053
                                                        414/679

FOREIGN PATENT DOCUMENTS

| CN | 113306499 A | * | 8/2021 | ............ B60R 5/04 |
| DE | 102005028627 B3 | * | 12/2006 | ......... B29C 43/003 |
| FR | 2897806 A1 | * | 8/2007 | ............ B60R 5/04 |
| FR | 2936460 A1 | * | 4/2010 | ............ B60R 5/04 |
| FR | 3098473 A1 | * | 1/2021 | ........... B60R 5/044 |
| KR | 2002-0052909 A | | 7/2002 | |
| KR | 1786353 B1 | * | 10/2017 | ........... B60R 5/044 |
| WO | WO-2008110773 A1 | * | 9/2008 | ............ B60R 5/04 |
| WO | WO-2020019032 A1 | * | 1/2020 | .......... A47B 3/0818 |

OTHER PUBLICATIONS

Machine translation of KR101786353 B1 (KR1786353 B1) (Year: 2017).*

* cited by examiner

*Primary Examiner* — Hilary L Gutman
(74) *Attorney, Agent, or Firm* — McDonnell Boehnen Hulbert & Berghoff LLP

(57) ABSTRACT

A luggage board device for a vehicle is configured to adjust a height of a partition board, which is composed of a front board, an intermediate board, and a rear board, through movements of the partition board in a vertical direction, in a state in which the partition board is horizontally unfolded, be utilized as a multi-stage shelf like a step shape by rotating the front board and the rear board up and down with the intermediate board as a reference, and be utilized as a table in indoor and outdoor spaces of a luggage room.

13 Claims, 14 Drawing Sheets

LUGGAGE BOARD DEVICE FOR VEHICLE

CROSS REFERENCE TO RELATED APPLICATIONS

The present application claims priority to Korean Patent Application No. 10-2020-0172632, Dec. 10, 2020, the entire contents of which is incorporated herein for all purposes by this reference.

BACKGROUND

Field

The present disclosure relates to a luggage board device for a vehicle and, more particularly, to a luggage board device for a vehicle capable of adjusting a height in up and down directions and being utilized as a multi-stage shelf.

Description of the Related Art

Recreational vehicles (RV, SUV, MPV, and the like) are formed with a luggage room in which cargo may be loaded behind a rear seat, and a floor of the luggage room is composed of a luggage board. In addition, a luggage tray capable of storing spare tires, tools, or the like thereon is formed at a side under the luggage board, so that storage space of the luggage tray is opened or closed by an opening and closing operation of the luggage board.

Conventionally, a luggage board of a general structure includes one single panel, and is installed by being simply laid on a luggage tray. Accordingly, it is not possible to adjust a height of the luggage board in a vertical direction, so there is a disadvantage of feeling uncomfortable because a worker has to bend over when loading or withdrawing the cargo on or from the luggage board.

In addition, the worker's arm does not reach an inner side of the luggage room so that the worker feels uncomfortable when loading and withdrawing the cargo.

The matters described as the related art are only for enhancing an understanding of the background of the present disclosure and should not be taken as acknowledging being in corresponding to a related art already known to those of ordinary skill in the art.

SUMMARY

Accordingly, the present disclosure has been made keeping in mind the above problems occurring in the related art and is to provide a luggage board device for a vehicle, which is capable of adjusting a height in up and down directions and being utilized as a multi-stage shelf. Thus, an objective of the present disclosure is to improve the convenience of work when loading or withdrawing cargo on or from the board.

In addition, as can be utilized as a table at an inner side or an outer side of the vehicle when necessary, the luggage board device according to the present disclosure has another objective of improving convenience in use.

In order to achieve the above objectives, there may be provided a luggage board device for a vehicle according to one aspect of the present disclosure, the luggage board device including a partition board connected through an intermediation of a connection rod, a main pinion coupled to the partition board, a first main rack gear and a second main rack gear engaged with the main pinion, the first main rack gear and the second main rack gear moving in opposite directions when the main pinion is operated, and a first bridge and a second bridge connecting the first main rack gear and the second main rack gear, respectively, to the vehicle body, wherein the luggage board device may be configured to be operated upward and downward by an interlocking structure of the main pinion, the first and second main rack gears, and the first and second bridges.

The partition board may rise when the first and second main rack gears move in directions toward the main pinion, respectively, and descend when the first and second main rack gears move in directions away from the main pinion.

The luggage board device may further include a main motor coupled to the main pinion; and a main switch configured to be manipulated to operate the main motor.

The partition board may include a front board, an intermediate board, and a rear board that are sequentially arranged along front and rear directions, wherein the connection rod may be coupled to side surfaces of the front board, the intermediate board, and the rear board so as to connect the side surfaces of the boards to each other.

The partition board may include a front board, an intermediate board, and a rear board that are sequentially arranged along front and rear directions, wherein the intermediate board may be equipped with the main pinion, the main motor, and the main switch.

The partition board may include a front board, an intermediate board, and a rear board that are sequentially arranged along front and rear directions, wherein the intermediate board may be equipped with main guiders under a bottom surface thereof, wherein the first main rack gear and the second main rack gear may be coupled to the main guiders, respectively, so as to be linearly movable in the front and rear directions.

The partition board may include a front board, an intermediate board, and a rear board that are sequentially arranged along front and rear directions, wherein, when the first main rack gear and the second main rack gear may linearly move due to a rotation of the main pinion, the front board, intermediate board, and rear board may move in up and down directions in a horizontally unfolded state, thereby being adjusted in height.

The partition board may be configured to be utilized as a table in a space at an inside and an outside of the vehicle through a height adjustment in up and down directions in a horizontally unfolded state.

The partition board may include a front board, an intermediate board, and a rear board that are sequentially arranged along front and rear directions, and may further include a support pinion rotatably coupled to the intermediate board, and a first support rack gear and a second support rack gear, both of which may engage with the support pinion, extend in opposite directions to each other, and linearly move in the opposite directions to each other when the support pinion rotates.

The luggage board device may further include a support motor coupled to the support pinion, and a support switch configured to be manipulated to operate the support motor.

The intermediate board may be equipped with support guiders under a bottom surface thereof, wherein the first support rack gear and the second support rack gear may be coupled to the support guiders, respectively, so as to be linearly movable in the front and rear directions.

When the partition board is adjusted in height while being moved up and down, the first support rack gear and the second support rack gear may support all of the front board, the intermediate board, and the rear board from positions under bottoms of all the boards, thereby preventing sagging of the front board or of the rear board.

When an external force is applied to the rear board in a state in which the first main rack gear and second main rack gear and the first support rack gear and second support rack gear are moved to be hidden by being placed only under the intermediate board, by a rotation of the connection rod, the front board and the rear board may be positioned in a step shape in upper and lower sides of the intermediate board, whereby the partition board may be able to be utilized as a multi-stage shelf.

A fixing protrusion and a fixing groove may be formed at the partition board and the connection rod, respectively, whereby when the partition board is utilized as a step-shaped shelf, the partition board may be maintained in a shape of the multi-stage shelf by a coupling of the fixing protrusion and the fixing groove.

As described above, the luggage board device according to the present disclosure is configured to be able to adjust the height through movement in the up and down directions in a horizontally unfolded state of a partition board consisting of a front board, an intermediate board, and a rear board so that there is an effect that the convenience of work when loading or withdrawing the cargo can be improved.

In addition, the luggage board device according to the present disclosure has a configuration that can be utilized as a multi-stage shelf like a step shape by rotating the front board and the rear board up and down, respectively, with respect to the intermediate board, so that convenience of the work can be improved through such a configuration when loading or withdrawing the cargo. In particular, as the board device can be utilized as a table at an inner side or an outer side of the vehicle as necessary, there is an effect of improving convenience in use.

BRIEF DESCRIPTION OF THE FIGURES

The above and other objectives, features, and other advantages of the present disclosure will be more clearly understood from the following detailed description when taken in conjunction with the accompanying drawings, in which.

DETAILED DESCRIPTION

Figure 1:
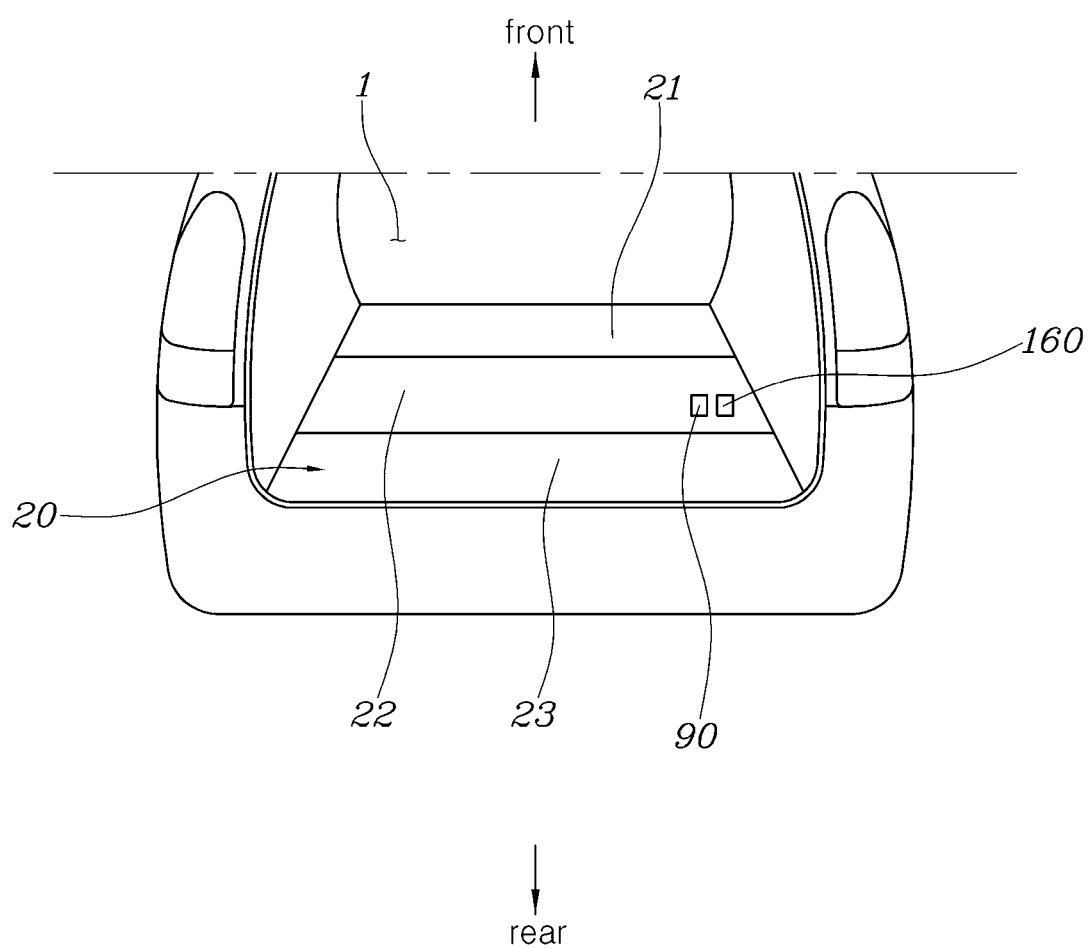
FIG. 1 is a view showing a luggage board device according to the present disclosure installed in a luggage room of a vehicle.
Figure 2:
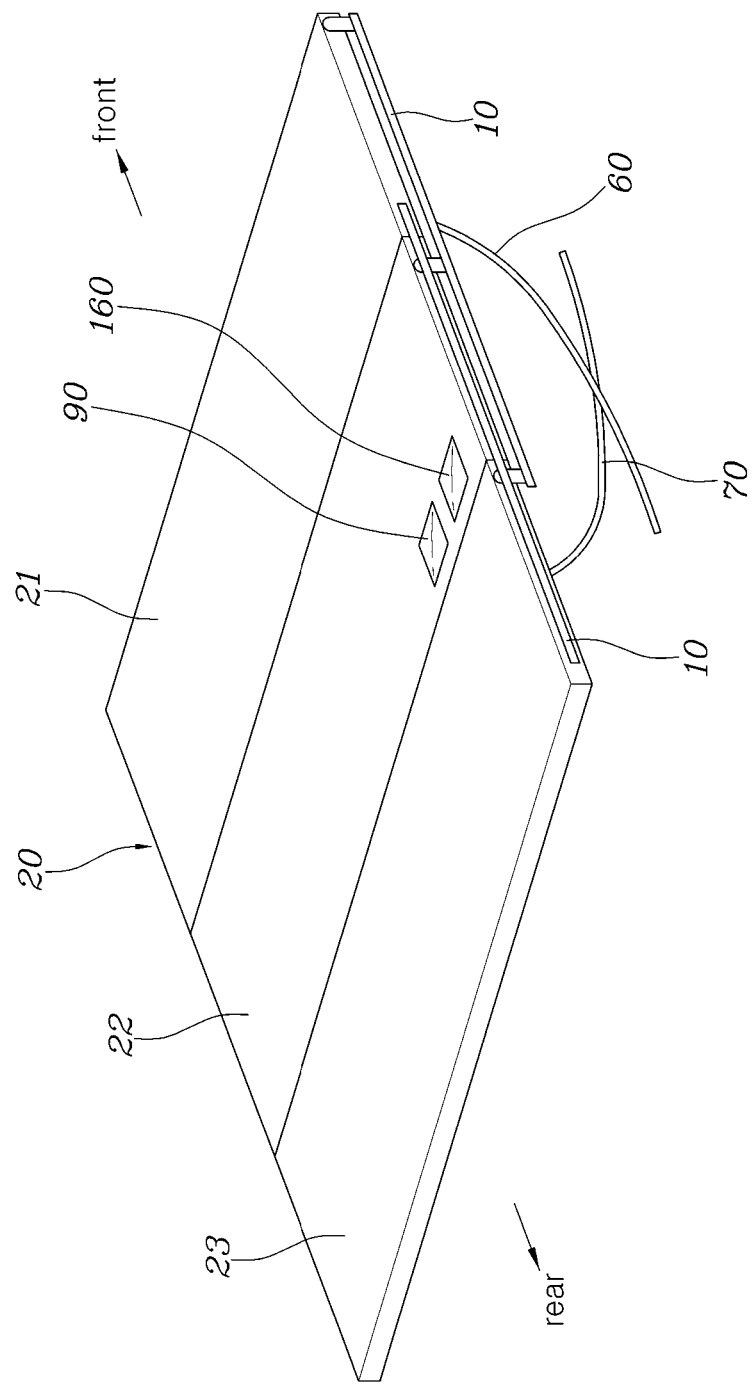
FIG. 2 is a perspective view of the luggage board device according to the present disclosure.
Figure 3:
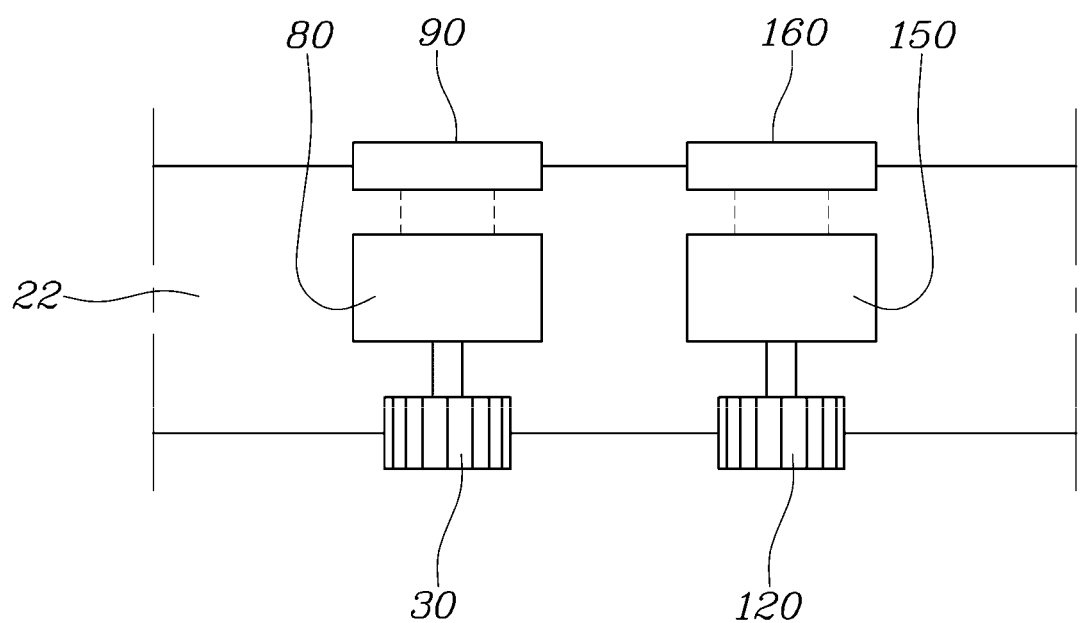
FIG. 3 is a sectional view of portions in which a main switch and a support switch are installed, respectively, in FIG. 2.
Figure 4:
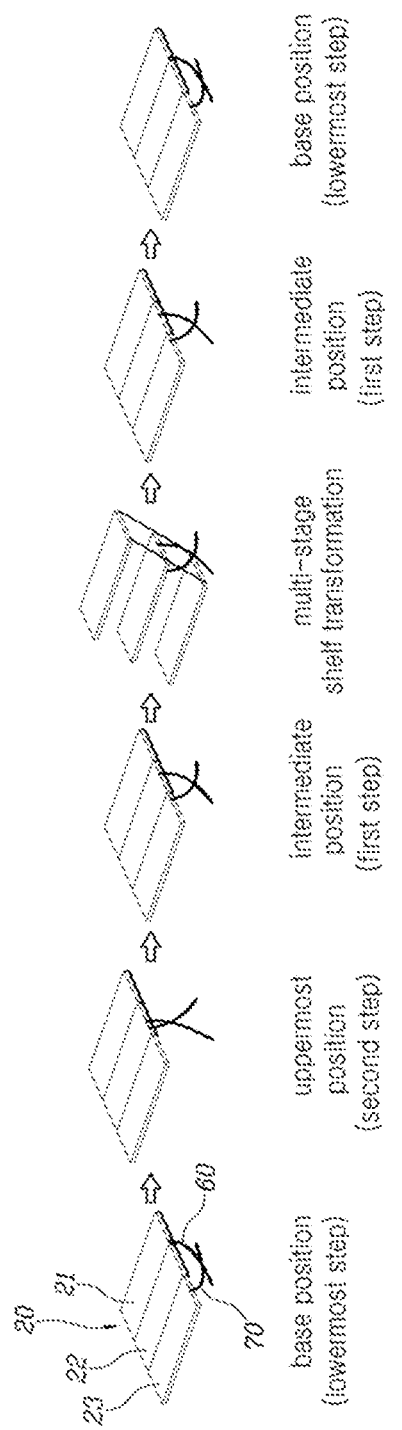
FIG. 4 is a view illustrating an operation process of the luggage board device according to the present disclosure.

Specific structural or functional descriptions of embodiments of the present disclosure disclosed in a present specification or application are exemplified only for a purpose of describing the embodiments according to the present disclosure. Accordingly, the embodiments according to the present disclosure may be implemented in various forms and should not be construed as limited to the embodiments described in the present specification or application.

Embodiments according to the present disclosure may be variously changed and have various forms. Here, specific embodiments are illustrated in the drawings and described in detail in the present specification or application. However, the specific embodiments are not intended to limit the embodiments according to the concept of the present disclosure to specific forms of disclosure and are to be understood to include all changes, equivalents, and substitutes included in the spirit and scope of the present disclosure.

Terms such as first, second, and the like may be used to describe various components, but the components should not be limited by the terms. The above terms are used only for the purpose of distinguishing one component from other components. For example, without departing from the scope of rights according to the concept of the present disclosure, the first component may be named as the second component, and similarly, the second component may also be named as the first component.

When a component is referred to as being "coupled" or "connected" to another component, it should be understood that the component may be directly coupled or connected to another component, but other components may exist between the components. On the other hand, when a component is referred to as being "directly coupled" or "directly connected" to another component, it should be understood that there is no other component between the components. Other expressions describing relationships between components, such as "between" and "just between" "adjacent to" and "directly adjacent to", or the like should be interpreted in the same manner as well.

The terms used in the present specification are only used to describe specific embodiments and are not intended to limit the present disclosure. Singular expressions include plural expressions unless the context clearly indicates otherwise. In the present specification, terms such as "include" or "have" should be understood: to be intended to designate existence of a set feature, number, step, action, component, part, or a combination thereof; and not to preclude, in advance, presence or addition of one or more other features, numbers, steps, actions, components, parts, or combinations thereof.

Unless otherwise defined, all terms used herein, including technical or scientific terms, have the same meaning as commonly understood by a person of ordinary skill in the art to which the present disclosure belongs. Terms such as those defined in a commonly used dictionary should be interpreted as having a meaning consistent with the meaning the context of the related technology has and should not be interpreted as an ideal or excessively formal meaning unless explicitly defined in the present specification.

A control unit (controller) according to an exemplary embodiment of the present disclosure may be implemented through a nonvolatile memory (not shown), which is configured to store an algorithm that is configured to control an operation of various components of a vehicle or to store data related to a software command that is configured to reproduce the algorithm, and a processor (not shown) that is configured to perform an operation described below using data stored in a corresponding memory. Here, the memory and the processor may be implemented as individual chips. Alternatively, the memory and processor may be implemented as a single chip integrated with each other. The processor may take a form of no less than one processor.

Hereinafter, a luggage vehicle board device according to a preferred embodiment of the present disclosure will be described with reference to the drawings of FIGS. 1 to 14.

The luggage vehicle board device according to the present disclosure includes a partition board 20 rotatably coupled to a connection rod 10 and connected through an intermediation of the connection rod 10, a main pinion 30 rotatably coupled to the partition board 20, a first main rack gear 40 and a second main rack gear 50, both of which engage with the main pinion 30, extend in opposite directions to each other, and linearly move in opposite directions to each other when the main pinion 30 rotates, a first bridge 60 connecting the first main rack gear 40 and a vehicle body, and a second bridge 70 connecting the second main rack gear 50 and the vehicle body, a main motor 80 coupled to the main pinion 30, and a main switch 90 configured to be manipulated to operate the main motor 80.

The partition board 20 is located in an inner space, that is, a luggage room 1, of the vehicle, and is composed of a front board 21, an intermediate board 22, and a rear board 23 arranged along front and rear directions.

The connection rod 10 is connected and coupled to side surfaces of the front board 21, the intermediate board 22, and the rear board 23. Here, the connection rod 10 may be provided only on one side surface of the partition board 20 or on both opposite side surfaces. In addition, two connection rods 10 may be provided for each of the side surfaces of the partition board 20 for stable operation.

The main pinion 30, the main motor 80, and the main switch 90 may be positioned under the intermediate board 22.

The main pinion 30 is located between the first main rack gear 40 and the second main rack gear 50, and a rear end of the first main rack gear 40 is engaged with the main pinion 30 at one side of the main pinion 30, and a front end of the first main rack gear 40 is disposed to extend toward the front of the vehicle.

A front end of the second main rack gear 50 is engaged with the main pinion 30 at an opposite side of the main pinion 30, and a rear end of the second main rack gear 50 is disposed to extend toward the rear of the vehicle.

The first bridge 60 and the second bridge 70 are formed of a rigid body, the first bridge 60 is installed such that an upper end thereof is coupled to the front end of the first main rack gear 40, and a lower end thereof is connected to the vehicle body, that is, the luggage room 1.

The second bridge 70 is positioned such that an upper end is coupled to the rear end of the second main rack gear 50, and a lower end is connected to the vehicle body, that is, the luggage room 1.

The first bridge 60 and the second bridge 70 may cross to create an X shape as in the embodiment of the present disclosure.

The main pinion 30 is positioned under the intermediate board 22 in order to be able to rotate by receiving power of the main motor 80, and the main motor 80 is connected to battery power of the vehicle and the operation thereof is controlled with the manipulation of the main switch 90.

The intermediate board 20 is equipped with main guiders 110 under a bottom surface thereof, wherein the first main rack gear 40 and the second main rack gear 50 may be coupled to the main guiders 110, respectively, thereby being able to linearly move in the front and rear directions.

The main guiders 110 serve not only to perform guiding the linear movement of the first main rack gear 40 and the second main rack gear 50 but also to perform simultaneously preventing sagging or separation of the first main rack gear 40 and the second main rack gear 50 to a lower side.

When the main motor 80 is operated by the manipulation of the main switch 90, the main pinion 30 rotates. When the first main rack gear 40 and the second main rack gear 50 linearly move due to a rotation of the main pinion 30, the front board 21, the intermediate board 22, and the rear board 23 may move in up and down directions in a horizontally unfolded state, thereby being adjusted in height thereof.

That is, when the first main rack gear 40 and the second main rack gear 50 linearly move in directions, respectively, toward the main pinion 30 due to the rotation of the main pinion 30, a height of the first bridge 60 and the second bridge 70 in the up and down directions is increased, and thus, the partition board 20 makes an upward movement toward an upper side in a horizontally unfolded state.

Conversely, when the first main rack gear 40 and the second main rack gear 50 linearly move in directions, respectively, away from the main pinion 30 due to the rotation of the main pinion 30, the height of the first bridge 60 and the second bridge 70 in the up and down directions is decreased, and thus, the partition board 20 makes a downward movement toward a lower side in a horizontally unfolded state.

Accordingly, in a horizontally unfolded state, the partition board 20 according to the present disclosure may be utilized as a table in a space at the inside and the outside of the vehicle through a height adjustment in the up and down directions.

That is, it is possible to utilize the partition board 20 as the table by adjusting the height in up and down directions in the luggage room 1 of the vehicle. In addition, when taken out of the luggage room 1, the partition board 20 including the first and second bridges 60 and 70 may be utilized as the table at the outside of the vehicle.

The luggage board device according to the present disclosure further includes a support pinion 120 rotatably coupled to the intermediate board 22, a first support rack gear 130 and a second support rack gear 140, both of which engage with the support pinion 120, extend in opposite directions to each other, and linearly move in opposite directions to each other when the support pinion 120 rotates, a support motor 150 coupled to the support pinion 120, and a support switch 160 configured to be manipulated to operate the support motor 150.

The support pinion 120 is located between the first support rack gear 130 and the second support rack gear 140, and a rear end of the first support rack gear 130 is engaged with the support pinion 120 at one side of the support pinion 120, and a front end of the first support rack gear 130 is disposed to extend toward the front of the vehicle.

A front end of the second support rack gear 140 is engaged with the support pinion 120 at an opposite side of the support pinion 120, and a rear end of the second support rack gear 120 is disposed to extend toward the rear of the vehicle.

The support pinion 120 is positioned under the intermediate board 22 in order to be able to rotate by receiving power of the support motor 150, and the support motor 150 is connected to the battery power of the vehicle and the operation thereof is controlled with the manipulation of the support switch 160.

The intermediate board 20 is equipped with support guiders 170 under the bottom surface, wherein the first support rack gear 130 and the second support rack gear 140 may be coupled to the support guiders 170, respectively, thereby being able to linearly move in the front and rear directions.

The support guiders 170 serve not only to perform guiding the linear movement of the first support rack gear 130 and the second support rack gear 140 but also to perform simultaneously preventing sagging or separation of the first support rack gear 130 and the second support rack gear 140 to the lower side.

According to the present disclosure, when the height of the partition board 20 is adjusted by being moved in a vertical direction, the first support rack gear 130 and the second support rack gear 140 may support all of the front board 21, the intermediate board 22, and the rear board 23 from positions under bottoms of all the boards, thereby preventing sagging of the front board 21 or the rear board 23.

Figure 11:
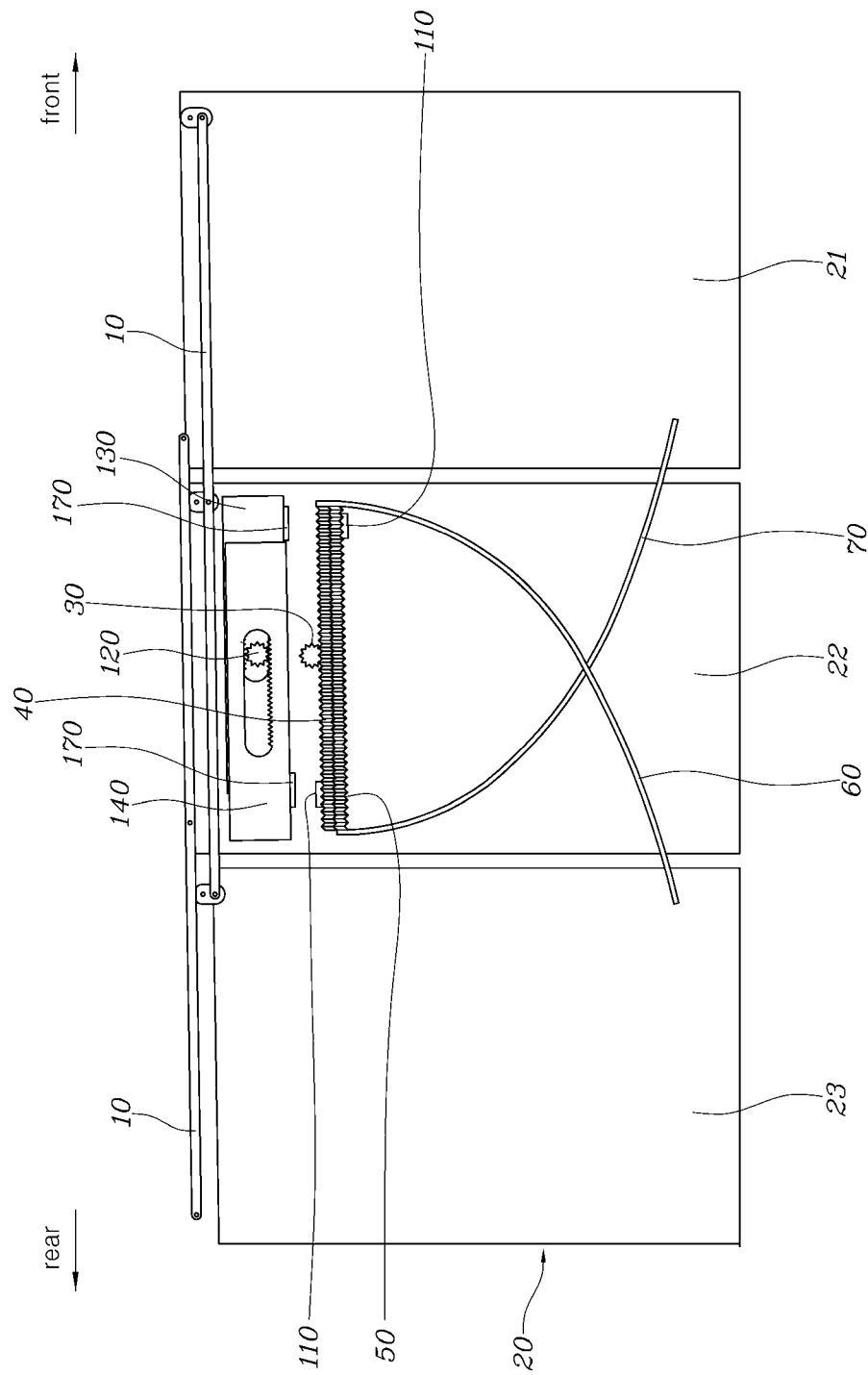
FIG. 11 is a view in a state in which a first main rack gear and second main rack gear and a first support rack gear and second support rack gear are moved to be hidden only under an intermediate board from the state of FIG. 10.
Figure 12:
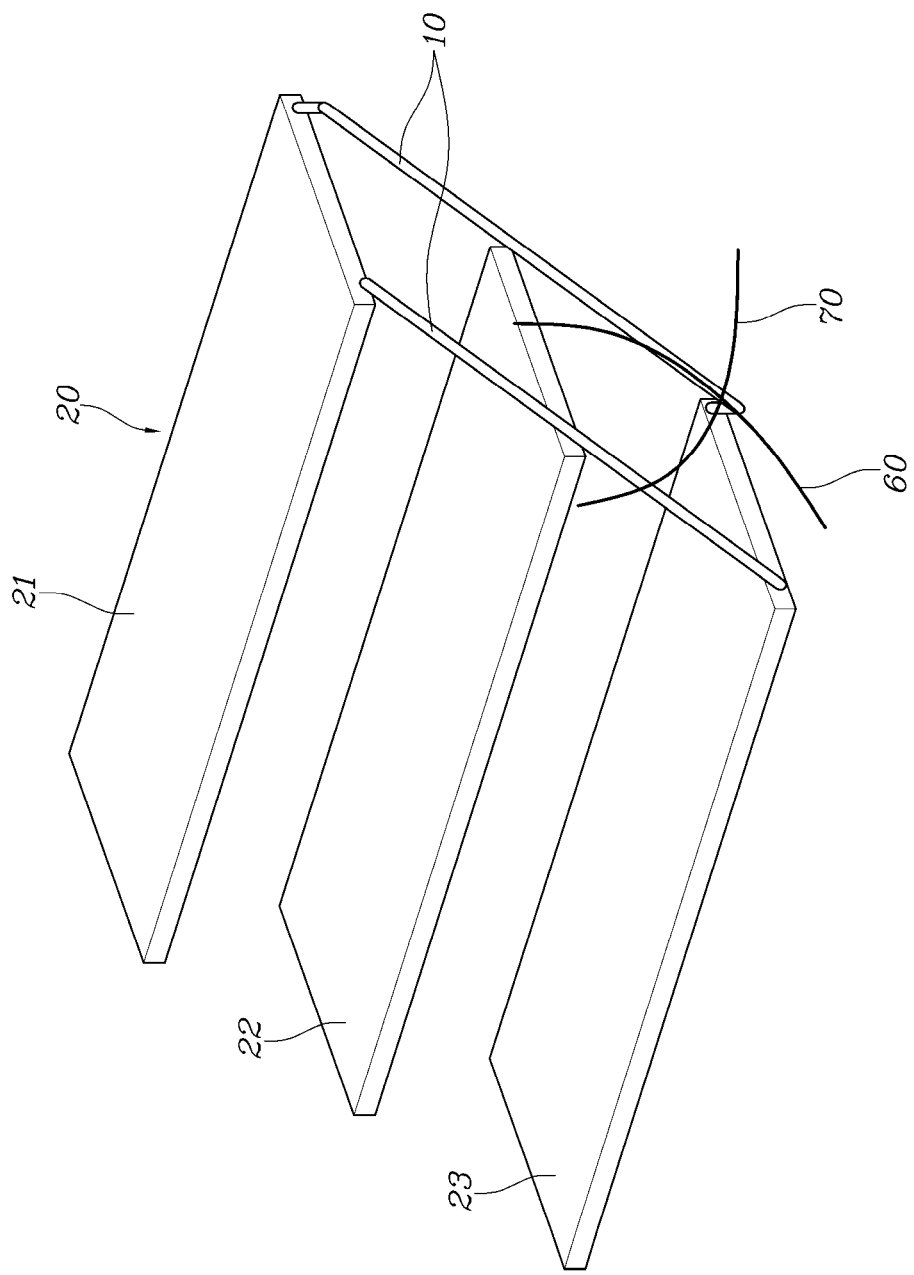
FIGS. 12 and 13 are a perspective view and a bottom view, respectively, in a state in which the partition board at a position of the intermediate step (first step) is transformed into a multi-stage shelf.

In addition, as shown in FIG. 11, when an external force is applied to the rear board 23 in a state in which the first main rack gear 40 and second main rack gear 50 and the first support rack gear 130 and second support rack gear 140 are moved to be hidden by being placed only under the intermediate board 22, by the rotation of the connection rod 10, the front board 21 and the rear board 23 are positioned in a step shape in the upper and lower sides of the intermediate board 22 as shown in FIG. 12, whereby the partition board is able to be utilized as a multi-stage shelf.

Figure 14:
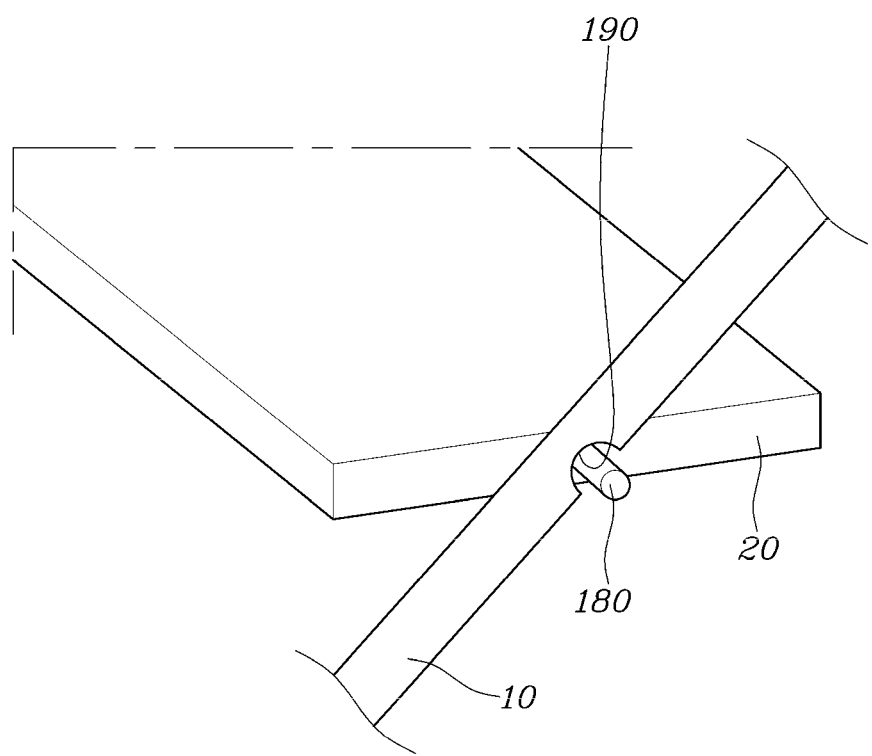
FIG. 14 is a view illustrating a fixing structure of the partition board in the state of FIG. 12.

Meanwhile, as shown in FIG. 14, a fixing protrusion 180 and a fixing groove 190 are formed at the partition board 20 and the connection rod 10, respectively, whereby when the partition board 20 is utilized as a step-shaped shelf, the partition board 20 is continuously maintained in the shape of the multi-stage shelf by the coupling of the fixing protrusion 180 and the fixing groove 190.

Hereinafter, the operation of the embodiments of the present disclosure will be described.

Figure 5:
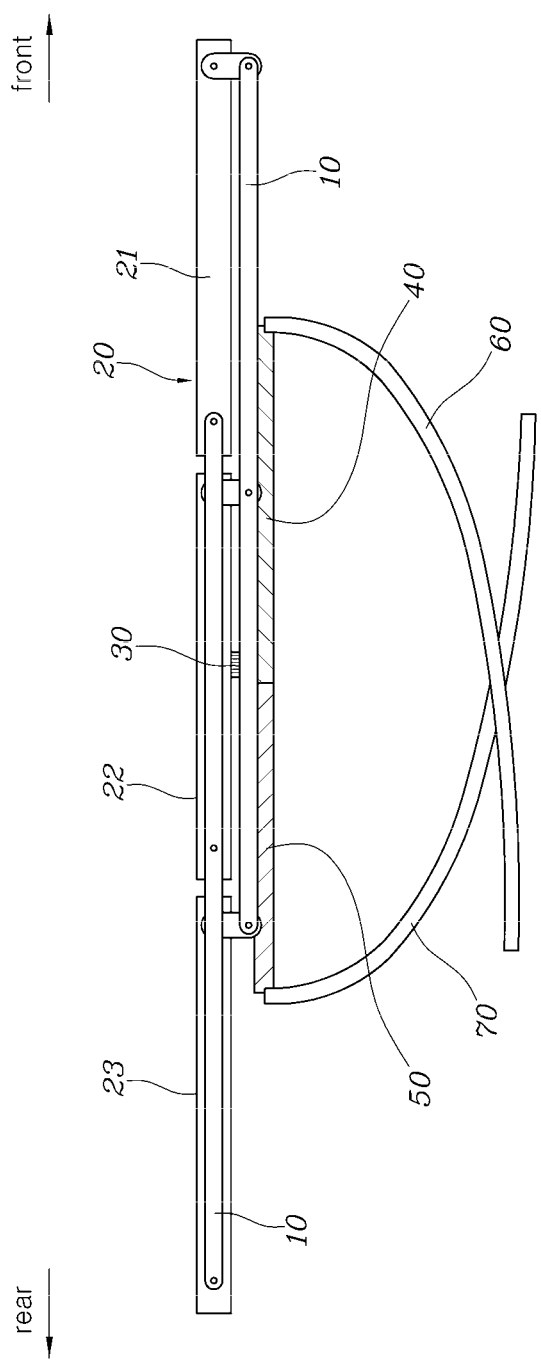
FIGS. 5 and 6 are a side view and a bottom view, respectively, in a state in which the partition board is located at a lowermost step (base step)
Figure 6:
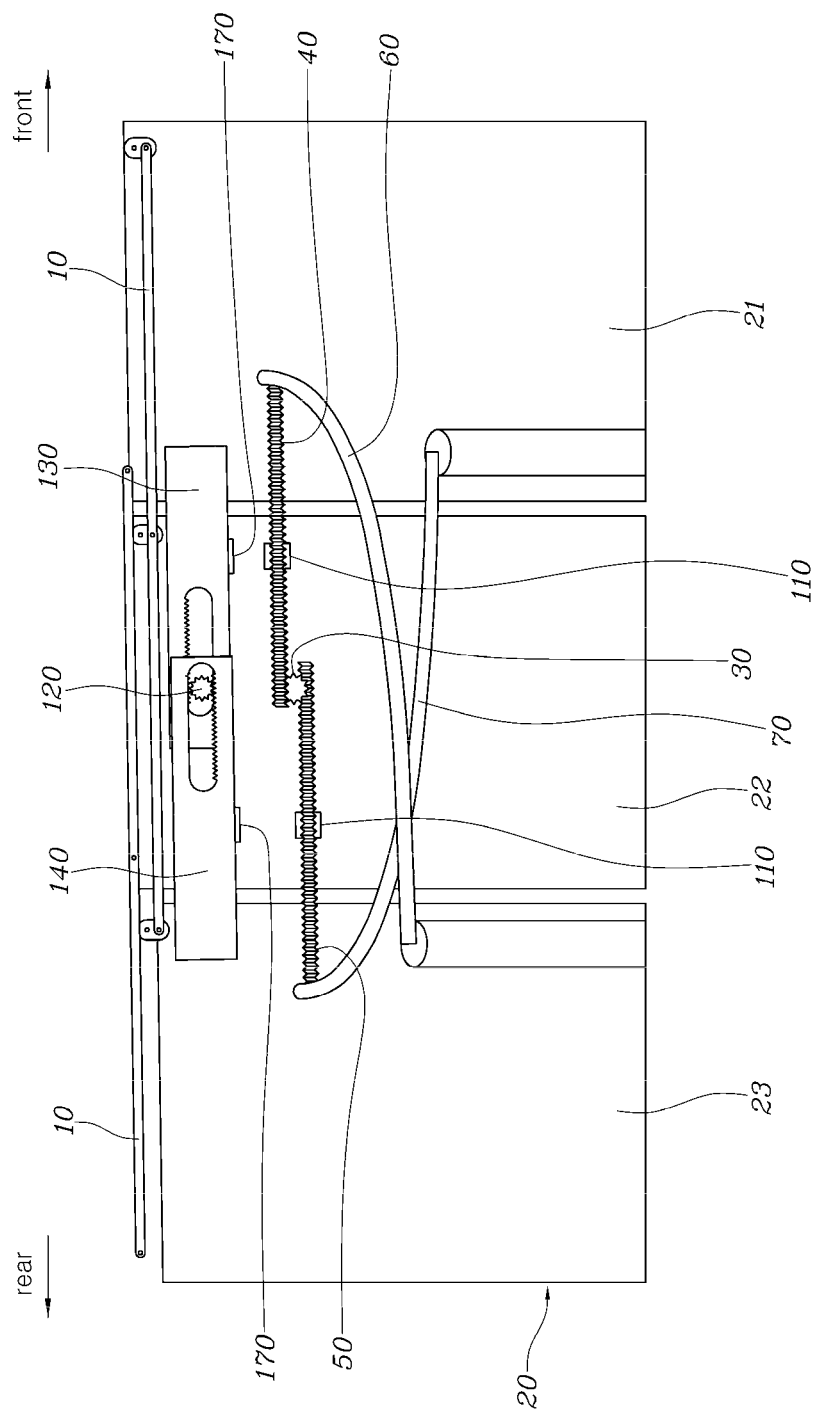

FIGS. 5 to 6 are views of the partition board 20 being positioned at the base (lowermost step). At this time, the first main rack gear 40 and second main rack gear 50 and the first support rack gear 130 and second support rack gear 140 may support all of the front board 21, the intermediate board 22, and the rear board 23 from positions under the bottoms of all the boards.

The main pinion 30 rotates when the main motor 80 is operated by the manipulation of the main switch 90. When the first main rack gear 40 and the second main rack gear 50 linearly move in the directions, respectively, toward the main pinion 30 due to the rotation of the main pinion 30, the height of the first bridge 60 and the second bridge 70 in the up and down directions is increased, whereby the partition board 20 makes the upward movement toward the upper side in the horizontally unfolded state.

Figure 7:
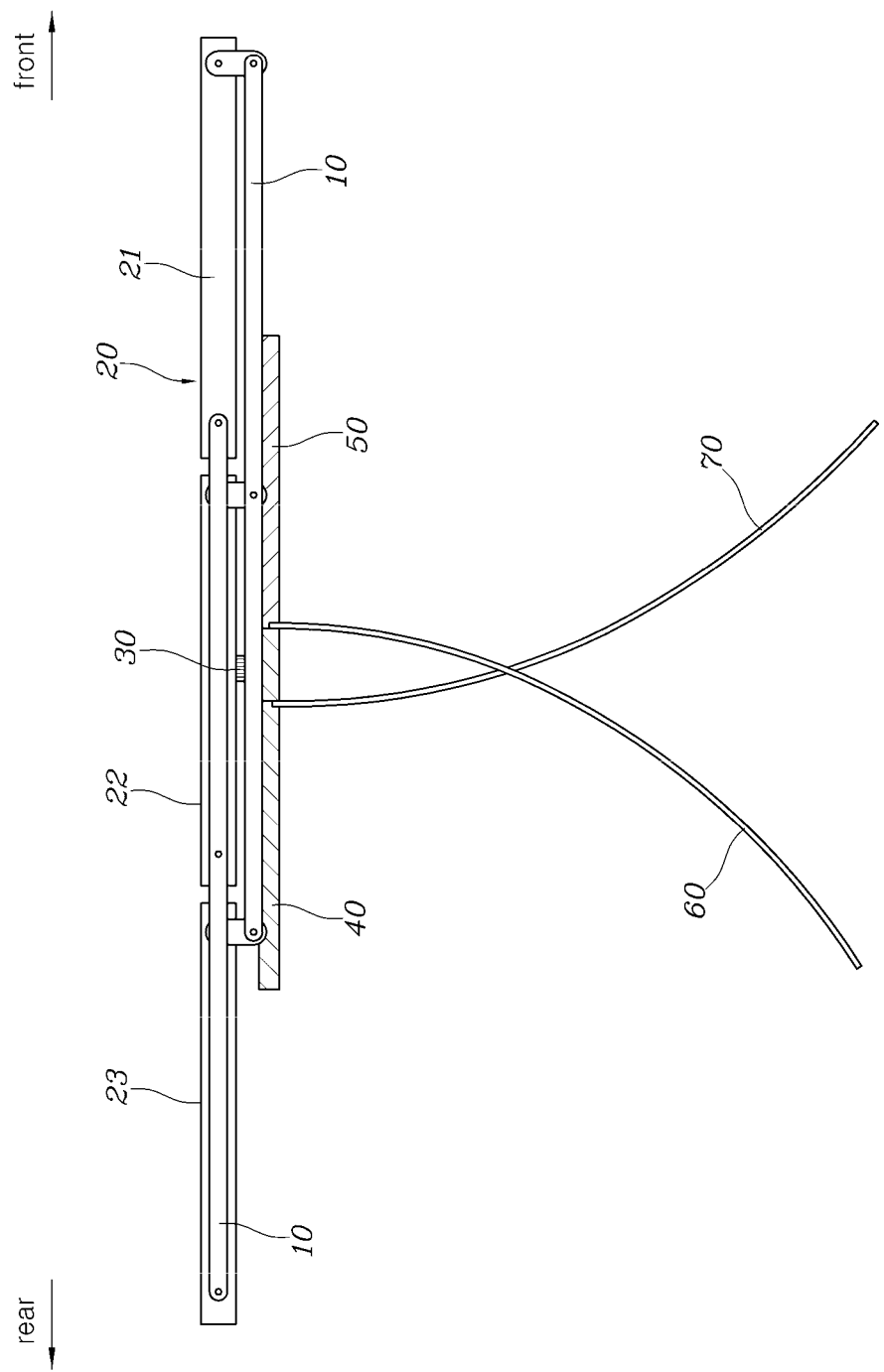
FIGS. 7 and 8 are a side view and a bottom view, respectively, in a state in which the partition board is located at an uppermost step (2nd step)
Figure 8:
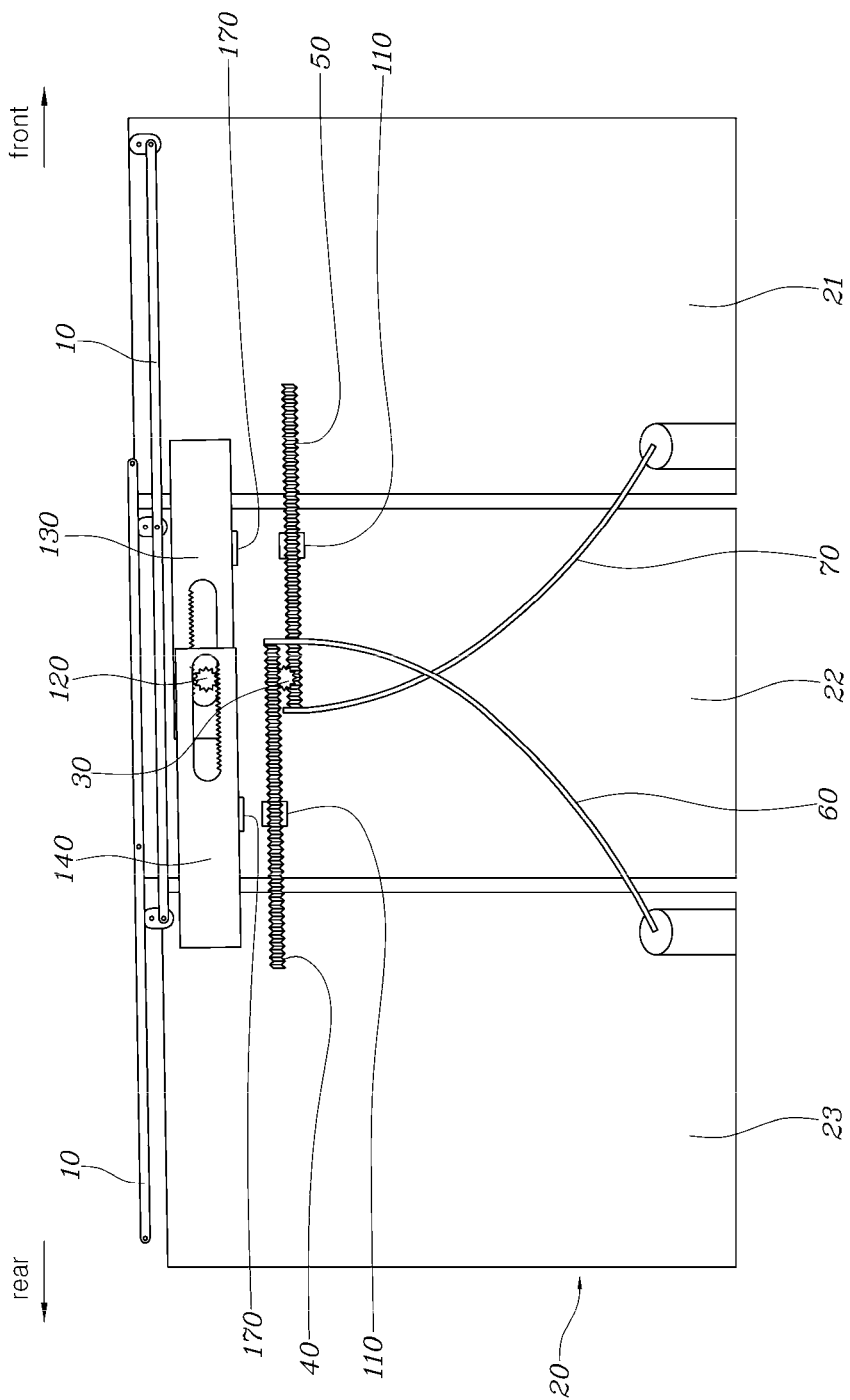
Figure 9:
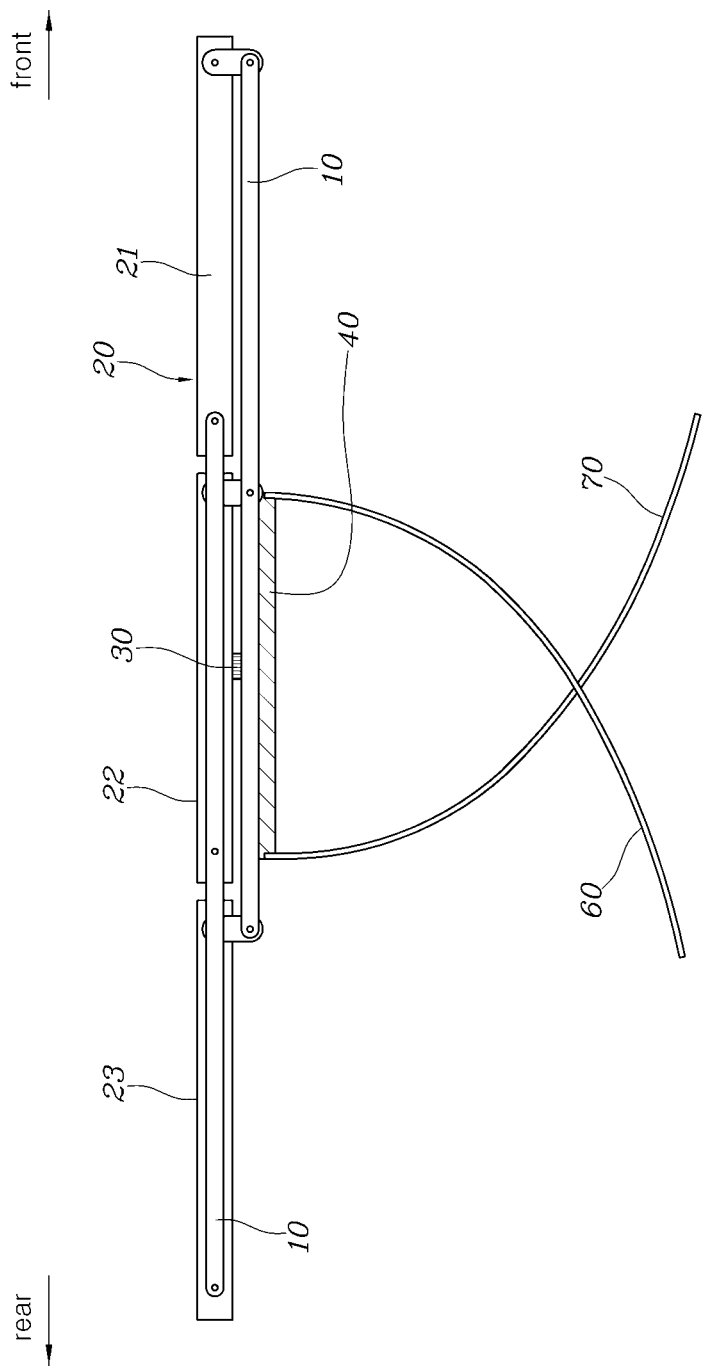
FIGS. 9 and 10 are a side view and a bottom view, respectively, in a state in which the partition board is located in an intermediate step (first step)
Figure 10:
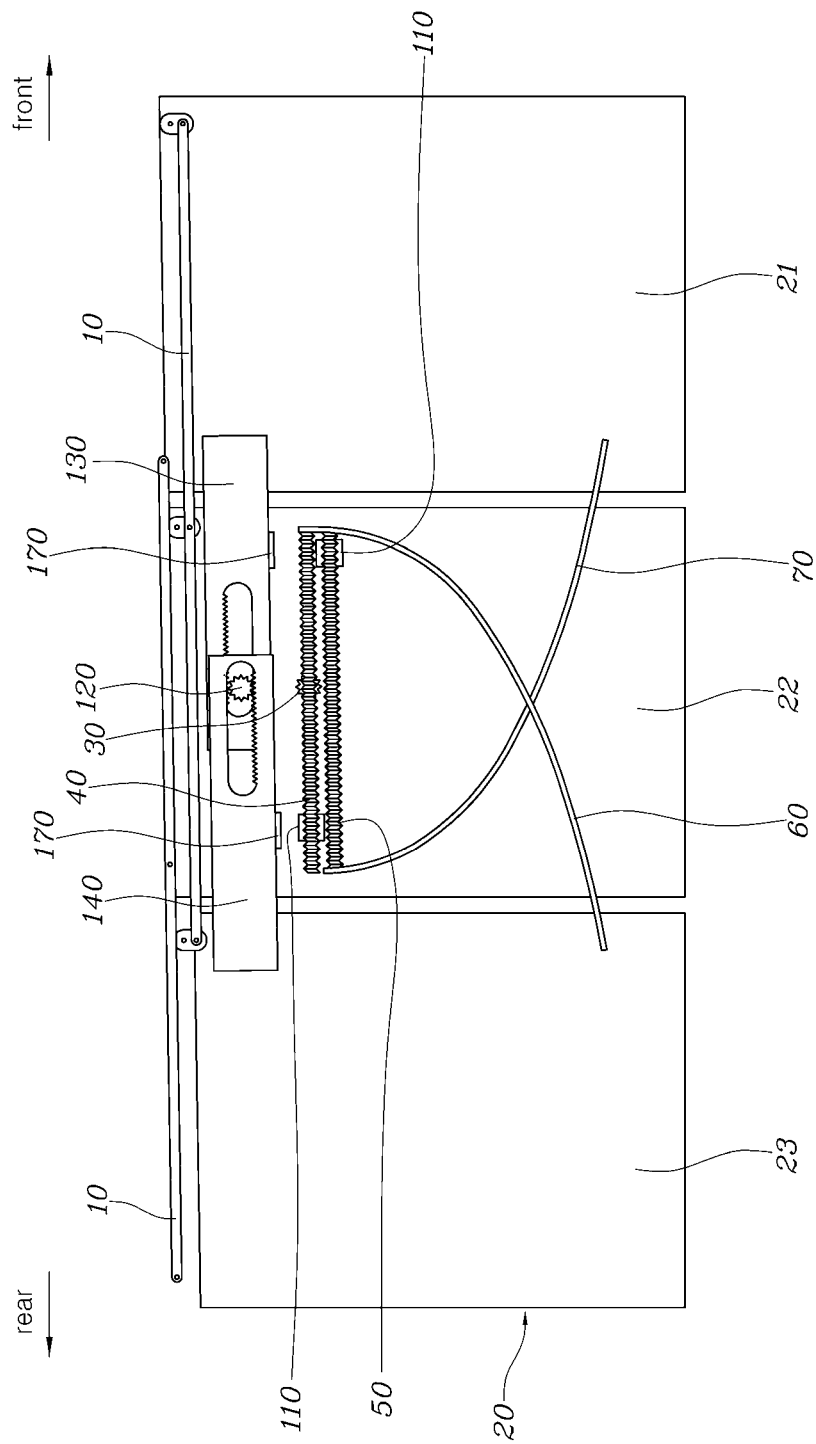

FIGS. 7 to 8 are views of the partition board 20 being positioned at the second step (uppermost step), and FIGS. 9 to 10 are views of the partition board 20 being positioned at the first step (intermediate step).

When the partition board 20 rises to come to a position of the intermediate step (first step), even though the front board 21 and the rear board 23 constituting the partition board 20 rotate, the front board 21 and the rear board 23 cause no interference with the vehicle body. Therefore, the transformation into the multi-stage shelf mode may be carried out when the partition board 20 is located in the intermediate step (first step).

When the partition board 20 rises from a position of the base (lowermost step) to the position of the intermediate step (first step), as shown in FIG. 10, the first main rack gear 40 and the second main rack gear 50 are to be in a state of being moved to be hidden only under the intermediate board 22.

In the state of FIG. 10, when the support pinion 120 rotates as the support motor 150 operates by the manipulation of the support switch 160, the first support rack gear 130 and the second support rack gear 140 linearly move due to the rotation of the support pinion 120 in directions, respectively, toward the support pinion 120, thereby being hidden only under the intermediate board 22 as shown in FIG. 11.

Figure 13:
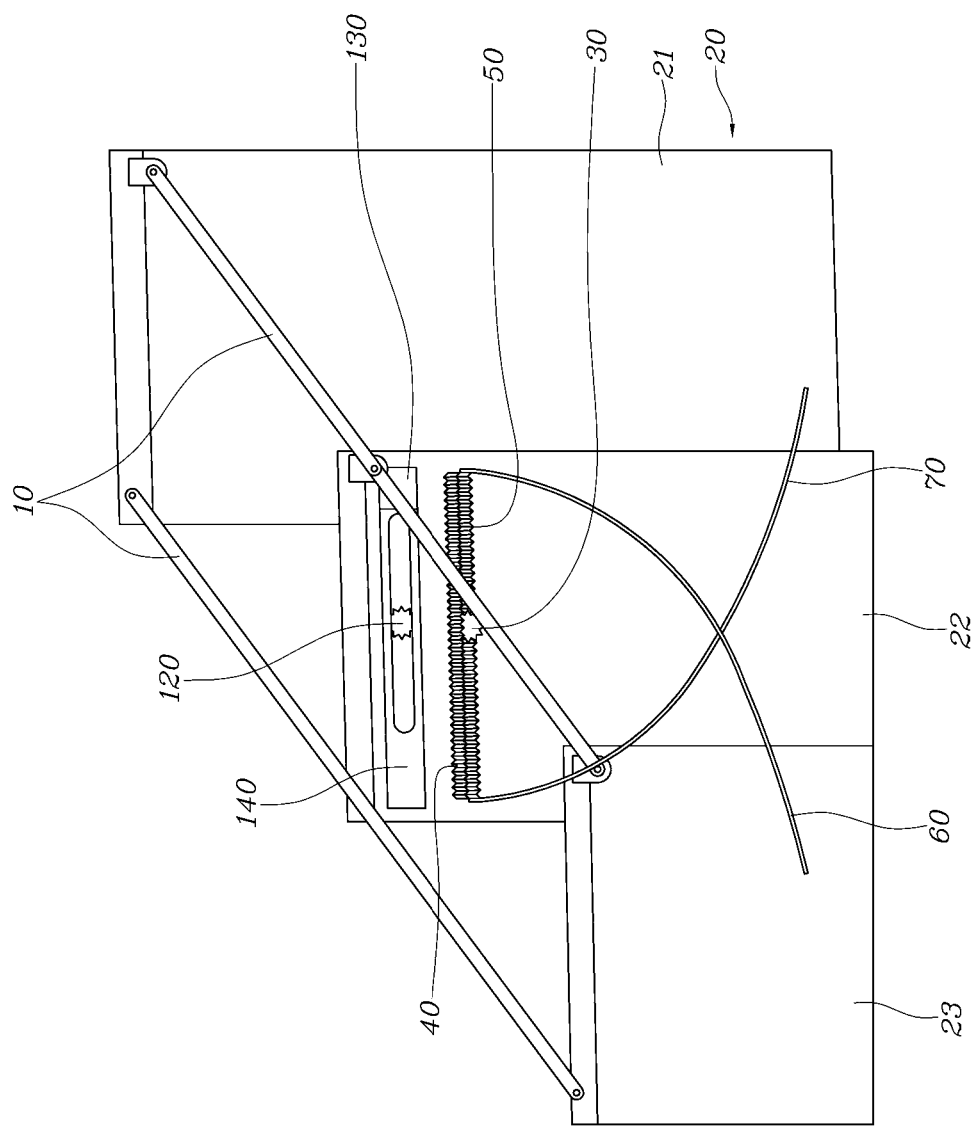

As shown in FIG. 11, in a state in which the first main rack gear 40 and second main rack gear 50 and the first support track gear 130 and second support rack gear 140 are hidden only under the intermediate board 22, when a user applies an external force to the rear board 23 so as to press the rear board downward, by the rotation of the connection rod 10, the front board 21 and rear board 23 are positioned in a step shape on the upper and lower sides of the intermediate board 22, respectively, as shown in FIGS. 12 to 13. Accordingly, the partition board 20 may be utilized as the multi-stage shelf.

A process of returning the partition board 20 to its original state is the reverse of the above-described operation, and detailed descriptions thereof will be omitted.

As described above, the luggage board device according to the present disclosure is configured to adjust the height of the partition board through movements of the partition board in the up and down directions in a state in which the partition board 20 composed of the front board 21, the intermediate board 22, and the rear board 23 is horizontally unfolded. Through such a configuration, there is an advantage that it is possible to improve the convenience of work when loading or withdrawing cargo on or from the partition board 20.

In addition, the luggage board device according to the present disclosure has the configuration that may be utilized as the multi-stage shelf like a step shape by rotating the front board 21 and the rear board 23 up and down with the intermediate board 22 as a reference. Through such a configuration, it is possible to improve the convenience of work when loading or withdrawing cargo. In particular, it may be utilized as a table in indoor and outdoor spaces of a vehicle, as necessary, so that there is an advantage of improving convenience in use.

Although the present disclosure has been illustrated and described in connection with specific embodiments, it will be obvious to a person of ordinary knowledge in the art that the present disclosure may be variously improved and changed within the scope of the technical spirit of the present disclosure provided by the following claims.

The invention claimed is:

1. A luggage board device for a vehicle, the device comprising:
   a partition board connected with a connection rod;
   a main pinion coupled to the partition board;
   a first main rack gear and a second main rack gear engaged with the main pinion, the first main rack gear and the second main rack gear moving in opposite directions when the main pinion is operated; and a first bridge connecting the first main rack gear to the vehicle body, and a second bridge connecting the second main rack gear to the vehicle body, wherein the luggage board device is configured to be operated upward and downward by an interlocking structure of the main pinion, the first and second main rack gears, and the first and second bridges;

wherein the partition board comprises a front board, an intermediate board, and a rear board that are sequentially arranged along front and rear directions, and wherein the connection rod is coupled to side surfaces of the front board, the intermediate board, and the rear board so as to connect the side surfaces of the boards to each other.

2. The device of claim 1, wherein the partition board rises when the first and second main rack gears move in directions toward the main pinion, respectively, and descends when the first and second main rack gears move in directions away from the main pinion.

3. The device of claim 1, further comprising:
a main motor coupled to the main pinion; and
a main switch configured to operate the main motor.

4. The device of claim 3,
wherein the intermediate board is equipped with the main pinion, the main motor, and the main switch.

5. The device of claim 1,
wherein the intermediate board is equipped with main guiders under a bottom surface thereof, wherein the first main rack gear and the second main rack gear are coupled to the main guiders, respectively, so as to be linearly movable in the front and rear directions.

6. The device of claim 1
wherein, when the first main rack gear and the second main rack gear linearly move due to a rotation of the main pinion, the front board, intermediate board, and rear board move in a vertical direction in a horizontally unfolded state, thereby being adjusted in height.

7. The device of claim 1, wherein the partition board is configured as a table in a space at an inside of the vehicle through a height adjustment in a vertical direction in a horizontally unfolded state.

8. The device of claim 1, wherein the partition board further comprises:
a support pinion rotatably coupled to the intermediate board; and
a first support rack gear and a second support rack gear, both of which engage with the support pinion, extend in opposite directions to each other, and linearly move in the opposite directions to each other when the support pinion rotates.

9. The device of claim 8, further comprising:
a support motor coupled to the support pinion; and
a support switch configured to be manipulated to operate the support motor.

10. The device of claim 8, wherein the intermediate board includes support guiders under a bottom surface thereof,
wherein the first support rack gear and the second support rack gear are coupled to the support guiders, respectively, so as to be linearly movable in the front and rear directions.

11. The device of claim 8, wherein, when the partition board is adjusted in height by being moved in a vertical direction, the first support rack gear and the second support rack gear support all of the front board, the intermediate board, and the rear board from positions under bottoms of all the boards, thereby preventing sagging of the front board or of the rear board.

12. The device of claim 8, wherein, when an external force is applied to the rear board when the first main rack gear and second main rack gear and the first support rack gear and second support rack gear are hidden by being placed only under the intermediate board, by a rotation of the connection rod, the front board and the rear board are positioned in a step shape in upper and lower sides of the intermediate board, wherein the partition board is used as a multi-stage shelf.

13. The device of claim 12, wherein a fixing protrusion and a fixing groove are formed at the partition board and the connection rod, respectively, wherein when the partition board is used as a step-shaped shelf, the partition board is maintained in a shape of the multi-stage shelf by a coupling of the fixing protrusion and the fixing groove.

* * * * *